(12) United States Patent
Maxted

(10) Patent No.: US 10,556,283 B2
(45) Date of Patent: Feb. 11, 2020

(54) GROMMET AND METHOD OF MAKING A GROMMET ASSEMBLY

(71) Applicant: Sumitomo Wiring Systems, Ltd., Yokkaichi-shi, Mie (JP)

(72) Inventor: Katsuo Maxted, Farmington Hills, MI (US)

(73) Assignee: Sumitomo Electric Wiring Systems, Ltd., Yokkaichi-Shi, Mie (JP)

( * ) Notice: Subject to any disclaimer, the term of this patent is extended or adjusted under 35 U.S.C. 154(b) by 76 days.

(21) Appl. No.: 15/847,030

(22) Filed: Dec. 19, 2017

(65) Prior Publication Data

US 2019/0184479 A1    Jun. 20, 2019

(51) Int. Cl.
| | |
|---|---|
| *H02G 3/22* | (2006.01) |
| *B23K 1/00* | (2006.01) |
| *B60R 16/02* | (2006.01) |
| *H01B 7/00* | (2006.01) |
| *H02G 3/04* | (2006.01) |

(52) U.S. Cl.
CPC ........ *B23K 1/0008* (2013.01); *B60R 16/0222* (2013.01); *H01B 7/0045* (2013.01); *H02G 3/0406* (2013.01); *H02G 3/22* (2013.01)

(58) Field of Classification Search
CPC ............ B60R 16/0215; B60R 16/0207; B60R 16/0222; F16L 5/00; F16L 5/02; H02G 3/04; H02G 3/22; H02G 3/24; H02G 3/30; H02G 3/36; H02G 3/0406; H01B 7/0045; H01B 7/00; B23K 1/008; B23K 1/00
USPC ........ 174/650, 152 R, 152 G, 652, 135, 142, 174/137 R, 151, 17 CT, 72 A; 439/587, 439/271, 272, 273, 274, 275; 16/2.1, 2.2; 248/56; 277/312, 314, 604, 607, 628
See application file for complete search history.

(56) References Cited

U.S. PATENT DOCUMENTS

| | | | | |
|---|---|---|---|---|
| 3,762,747 | A | * | 10/1973 | Griffen .................... F16C 11/04 403/225 |
| 4,487,998 | A | * | 12/1984 | Pegram ................ H02G 3/0641 174/153 G |
| 5,639,993 | A | | 6/1997 | Ideno et al. |
| 5,856,635 | A | * | 1/1999 | Fujisawa ............. B60R 16/0222 16/2.1 |
| 6,114,629 | A | * | 9/2000 | Roush ...................... H02G 3/22 16/2.1 |

(Continued)

FOREIGN PATENT DOCUMENTS

| | | |
|---|---|---|
| EP | 2661161 A1 | 11/2013 |
| GB | 299649 A | 11/1928 |

*Primary Examiner* — Angel R Estrada
(74) *Attorney, Agent, or Firm* — Honigman LLP

(57) ABSTRACT

A grommet is configured to be secured onto a wiring harness even when the diameter of the wiring harness shrinks. The grommet includes a tubular body having an inner wall defining a through-hole which is dimensioned to hold the wiring harness. The grommet includes a hole configured to receive a soldering tip of a soldering iron. The hole is open at the outer surface of the first body member and closed by the inner wall, wherein the inner wall serves as a temporary barrier which prevents the soldering tip of the soldering iron from coming into direct contact with the wiring harness. Thus, the soldering tip can melt a portion of the inner wall to adhere the grommet to the wiring harness without damaging the wiring harness.

9 Claims, 4 Drawing Sheets

(56) References Cited

U.S. PATENT DOCUMENTS

| | | | |
|---|---|---|---|
| 6,225,562 B1 * | 5/2001 | Fujishita | B60R 16/0222 174/152 G |
| 6,768,058 B2 * | 7/2004 | Pallapothu | B60R 16/0222 16/2.1 |
| 7,683,265 B2 * | 3/2010 | Uchida | B60R 16/0222 16/2.1 |

* cited by examiner

GROMMET AND METHOD OF MAKING A GROMMET ASSEMBLY

TECHNICAL FIELD

The present specification generally relates to grommets and a method for making a grommet assembly, and more particularly to grommets assemblies configured to be secured onto a wiring harness.

BACKGROUND

In general, grommets may be used to protect a wiring harness such as a wiring harness and to assist in installing the wiring harness into a substrate such as a panel of an automotive vehicle or a bracket for routing the wiring harness. The grommet includes a first body member opposite a second body member and a catch for engaging the opening of a substrate to secure the grommet thereto.

The grommet includes a through-hole for holding the wiring harness. Currently, the wiring harness is configured to mate with the grommet in a press-fit engagement. The wiring harness, which may be formed of multiple strands of electric wires which are sheathed in a polyurethane sleeve. Currently, the diameter of the through-hole is made to be smaller than the diameter of the wiring harness.

The wiring harness is inserted through the through-hole of the grommet by expanding the diameter of the through-hole, wherein the diameter may simply retract onto the wiring harness to secure the wiring harness in a press-fit manner. Expansion of the diameter may be done by using an air hose to blow the through-hole open. However, the diameter of the outer polyurethane sleeve may shrink due to an increase in temperature which results in a lessening of the retention strength.

Accordingly, it remains desirable to have a grommet configured to secure the wiring harness even when the diameter of the outer sleeve shrinks.

SUMMARY

In one embodiment, a grommet is configured to be secured onto a wiring harness to the through-hole of the grommet even when the diameter of the wiring harness shrinks. In particular, the grommet is configured to adhere to the wiring harness without melting the polyurethane sleeve protecting the wiring harness. The grommet is further configured to hold the wiring harness so as to maximize flexibility of the wiring harness while maintaining sufficient retention force on the wiring harness.

The grommet includes a tubular body. The tubular body includes an inner wall defining a through-hole. The through-hole extends through the axial length of the tubular body to define a first opening and a second opening directly opposite of the first opening. The through-hole is dimensioned to hold the wiring harness.

The grommet may further include a catch. The catch is configured to engage a substrate so as to secure the grommet to the substrate and allow the electric conductor to be routed through the substrate. The catch is illustratively shown as a circumferential groove defined by a first collar spaced apart from an opposite a second collar.

The tubular body includes a hole which extends radially from an outer surface of the tubular body to the inner wall which defines a portion of the through-hole to which the outer surface of the tubular body is generally concentric. Thus, the through-hole is bound in its entirety by the inner wall.

The hole may be generally uniform in diameter and is configured to receive a soldering tip of a soldering iron. The hole is open at the outer surface of the first body member and closed by the inner wall, wherein the inner wall serves as a barrier which prevents the soldering tip of the soldering iron from coming into direct contact with the wiring harness. When the soldering tip makes contact with the inner wall the inner wall melts. The melted portion of the inner wall adheres to the sleeve and changes state from a liquid to a solid so as to form a unitary piece with respect to the sleeve. In such a manner the inner wall adheres to the sleeve without damaging the wiring harness.

In one embodiment, the tubular body includes a first body member opposite a second body member. The catch is disposed between the first body member and the second body member. In one embodiment of the catch, the catch is a circumferential groove. The through-hole extends through the first body member, the catch and the second body member to define a first opening and a second opening. The through-hole is dimensioned to hold the wiring harness.

The catch may be configured to engage the opening of the substrate so as to secure the grommet to the substrate and allow the electric conductor to be route through the substrate. In such a configuration, the first body member is disposed on a first surface of the substrate and the second body member is disposed on a second surface of the substrate, wherein the first surface is opposite the second surface. In one embodiment, the hole is disposed on the first body member. The soldering tip is inserted into the hole. Upon actuation of a soldering device, the soldering tip is heated to melt the area of the grommet surrounding the soldering tip and adheres the grommet to the wiring harness without melting the protective polyurethane sleeve. Further, as the grommet adheres to the protective sleeve, the grommet will remain fixed to the wiring harness even when the diameter of the wiring harness shrinks.

In one embodiment, the tubular body includes a plurality of holes. The holes may be uniform in dimension. The holes are configured to provide a respective number of adhesion points. That is, each hole is configured to receive a soldering tip of a soldering iron and thus provides an adhesion point, wherein the grommet is melted and adhered to the wiring harness when cooled. In such an embodiment, it is possible to configure the grommet assembly with a desired retention force on the wiring harness. Further, by selectively placing the adhesion points, flexibility of the wiring harness may be controlled.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION

Figure 1:
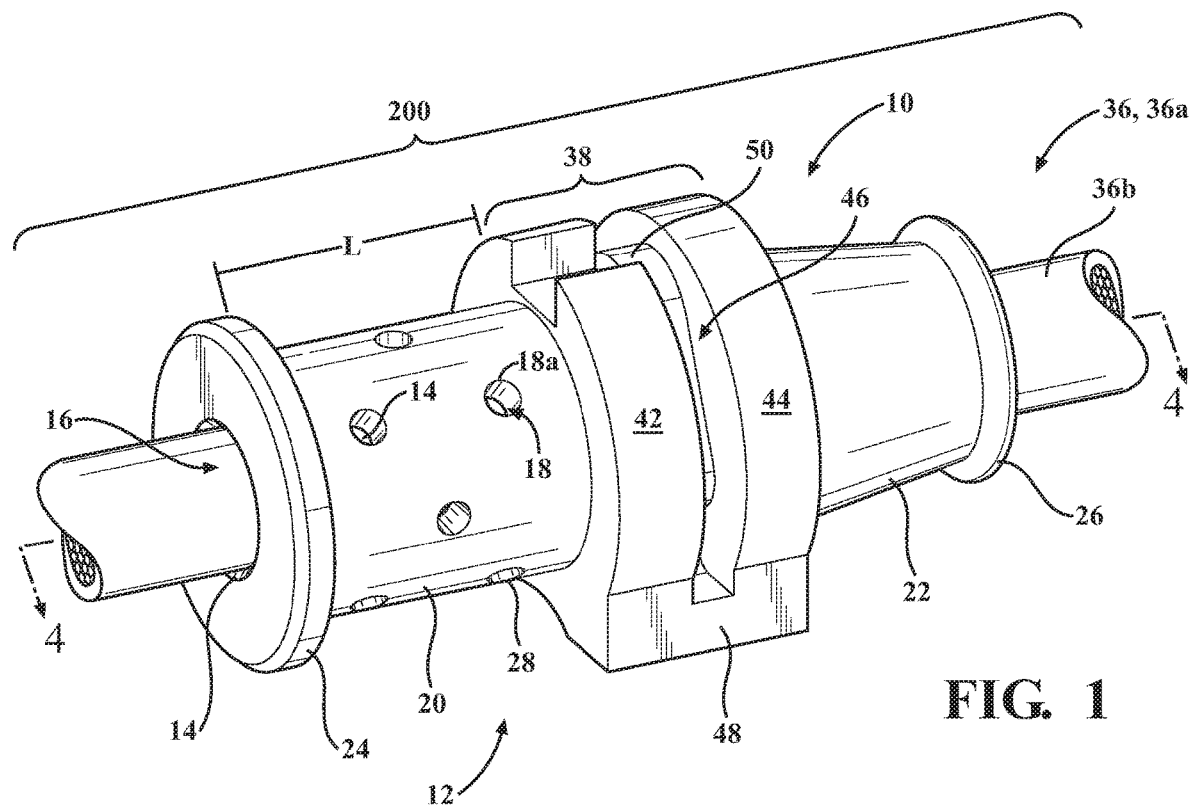
FIG. 1 schematically a grommet according to one or more embodiments described and illustrated herein.

Referring generally to the figures, embodiments of the present disclosure include a grommet configured to be adhered to a wiring harness to withstand shrinkage of the wiring harness. In particular, the grommet is configured to be melted to and form adhesion points to the wiring harness. As used herein, the term "adhesion point" refers to the adhesion between the grommet and the wiring harness formed when a portion of the grommet melts and cools onto the wiring harness. In a preferred embodiment, the wiring harness is sheathed by a protective sleeve. The protective sleeve may be formed out of a pliable material of similar molecular structure as the grommet to facilitate the adhesion of the grommet to the wiring harness. In a preferred embodiment, the sleeve and the grommet are formed of the same material composition. It should be appreciated that materials having similar molecular structure adaptable for use herein are configured to bind with one another when melted and cooled and also retain electric insulating properties.

The grommet is further configured to hold a wiring harness with a predetermined retention strength and provide rigidity in predetermined locations of the wiring harness to facilitate routing and maintain functionality of the wiring harness. For example, increasing the number of adhesion points increases the retention strength of the grommet. With respect to controlling the rigidity of the wiring harness, the rigidity of the wiring harness may be achieved by concentrating a plurality of adhesion points along a predetermined length of the wiring harness. Naturally, the absence of adhesion points provides maximum flexibility to the wiring harness.

The grommet includes a tubular body. The tubular body includes an inner wall defining a through-hole. The through-hole extends through the axial length of the tubular body so to define a first opening and a second opening opposite of the first opening. The through-hole is dimensioned to hold the wiring harness.

The grommet is configured to engage a substrate or bracket so as to facilitate wire harness routing. In one embodiment, the grommet may further include a catch. The catch is configured to engage the substrate so as to secure the grommet to the substrate and allow the wiring harness to be routed through the substrate.

The tubular body includes a hole which extends radially from an outer surface of the tubular body to the inner wall. Thus, the through-hole is bound in its entirety by the inner wall. The hole may be generally uniform in diameter and is configured to receive a soldering tip of a soldering iron. The holes are open at the outer surface of the first body member and closed by the inner wall, wherein the inner wall forms a barrier which prevents the soldering tip of the soldering iron from coming into contact with the wiring harness. After the soldering tip makes contact with the inner wall, the soldering tip is heated to melt a portion of the inner wall, and when the melted portion cools, the melted portion changes state from a liquid to a solid, in essence drying so as to adhere to the wiring harness and form a unitary structure without damaging the wiring harness.

Figure 2:
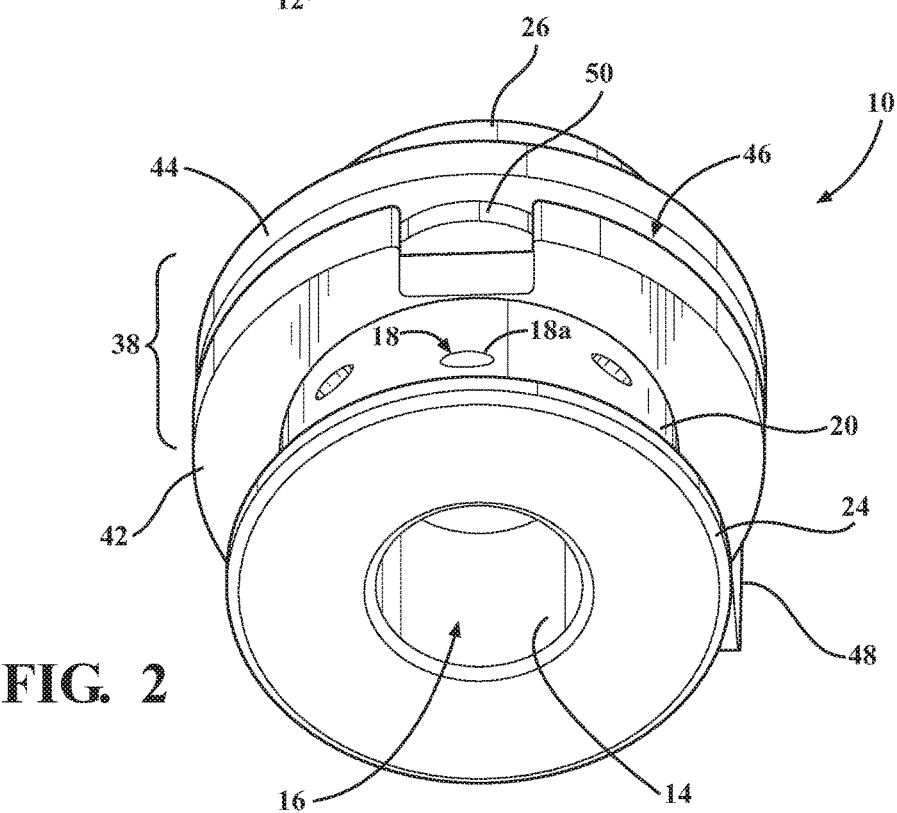
FIG. 2 is a view of the grommet shown in FIG. 1 take from the first body member.
Figure 3:
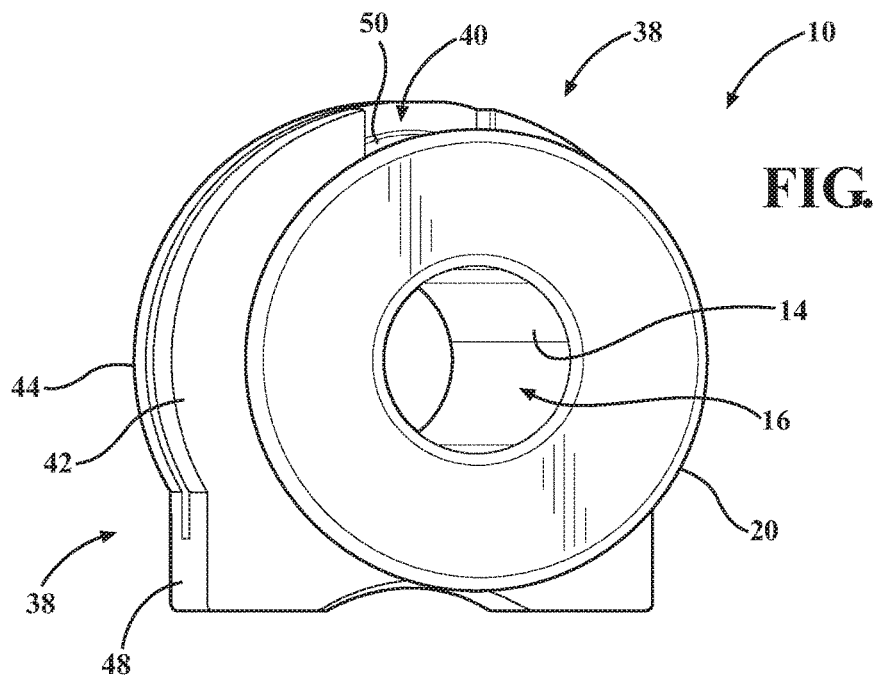
FIG. 3 is a view of the grommet shown in FIG. 1 showing the through-hole.

With reference now to FIGS. 1-3, an illustrative embodiment of a grommet 10 is provided. The grommet 10 is illustratively shown as having a tubular body 12. The tubular body 12 may be formed of any polyurethane rubber configured to melt at 200° C., and any such material may be adapted for use herein illustratively including materials made and sold under the mark Adiprene®, Millathane® and Vibrathane®. The tubular body 12 includes an inner wall 14 defining a through-hole 16.

A hole 18 is formed on the tubular body 12. The hole 18 extends from an outer surface of the tubular body to the inner wall 14. The through-hole 16 is continuous and defined by the inner wall 14.

The tubular body 12 may include a first body member 20 axially aligned with a second body member 22. The through-hole 16 extends axially through the first body member 20 and the second body member 22. The first body member 20 may include a first lip 24 disposed on a proximal end of the tubular body 12. The second body member 22 may include a second lip 26 disposed on a distal end of the tubular body 12.

In one embodiment, the second body member 22 is generally frustoconical wherein the proximal end of the second body member 22 has a diameter larger than the distal end of the second body member 22. The outer surface of the second body member 22 may be generally smooth. The second lip 26 extends radially from the outer surface of the frustoconical second body member 22.

The first body member 20 may also be generally conical. Though FIGS. 1-3 show that the first body member 20 has a length "L" generally similar to that of the second body member 22, it should be appreciated that the dimensions shown are provided for illustrative purposes and the first body member 20 and the second body member 22 may be shaped and lengthened otherwise without limiting the scope of the appended claims.

Figure 4:
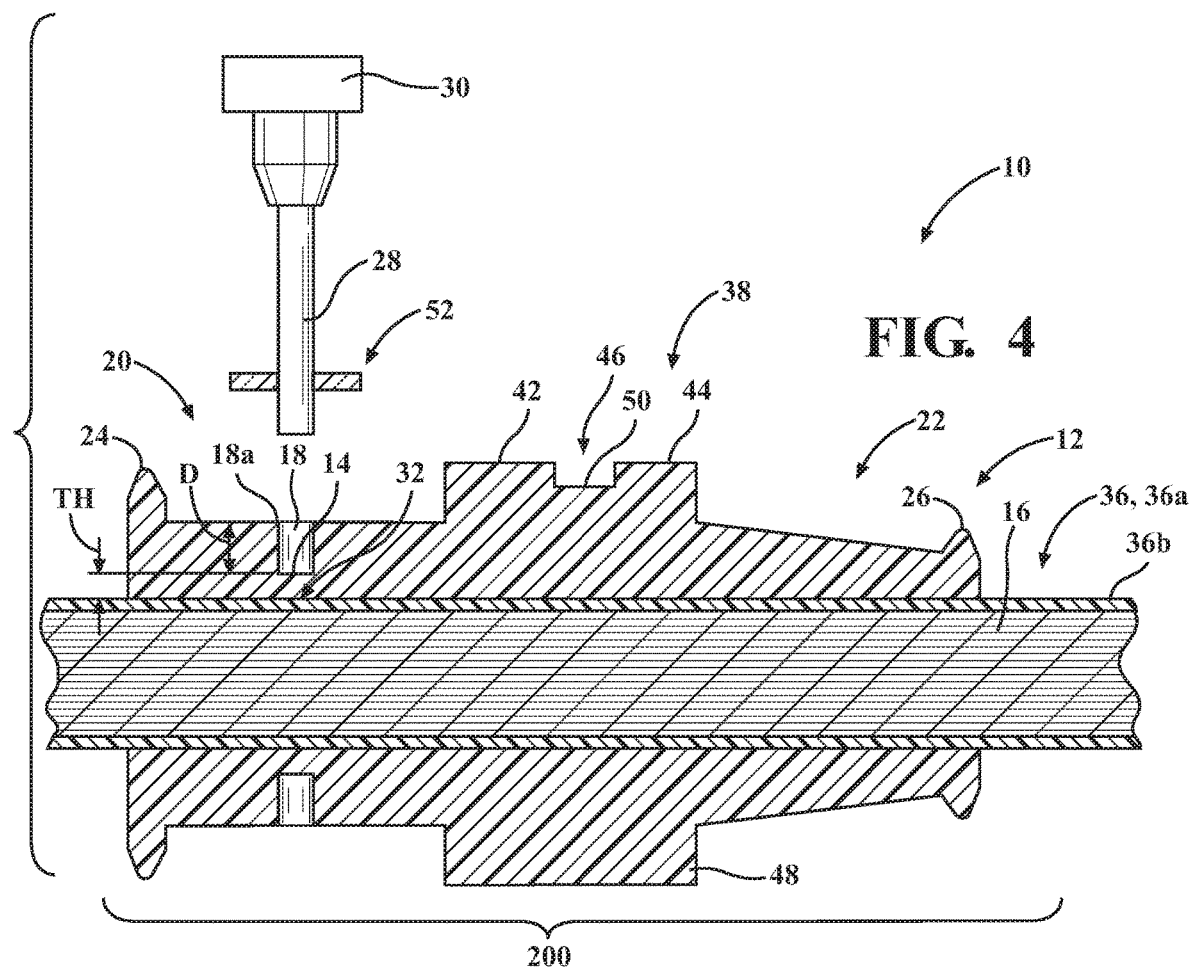
FIG. 4 is a cross-sectional view of the grommet shown in FIG. 1 taken along lines 4-4 showing a soldering tip registered to engage a hole.

With reference again to FIGS. 1 and 2 and also to FIG. 4, the hole 18 is formed by an opening 18a on an outer surface of the first body member 20. The hole 18 may be generally uniform in diameter and is configured to receive a soldering tip 28 of a soldering device 30. The hole 18 is open at the outer surface of the first body member 20 and closed by the inner wall 14, wherein the inner wall 14 forms a barrier 32 which prevents the soldering tip 28 of the soldering device 30 from coming into contact with a wiring harness 36.

The wiring harness 36 is shown disposed within the through-hole 16 and extends beyond the ends of the grommet 10. For illustrative purposes, the wiring harness 36 is a wiring harness 36a. The wiring harness 36a may be coupled between various electronic components in various applications to include automotive vehicles. The wiring harness 36 may be sheathed by a protective sleeve 36b. Preferably, the protective sleeve 36b is made of the same material as the inner wall 14 of the grommet 10.

The hole 18 extends radially from the center of the through-hole 16. The inner wall 14 includes a thickness, indicated by "TH" which defines the barrier 32 and prevents the soldering tip 28 from coming into direct contact with the wiring harness 36. The thickness may be varied based upon the material used to manufacture the grommet 10 and the operating temperature of the soldering tip 28.

Figure 6:
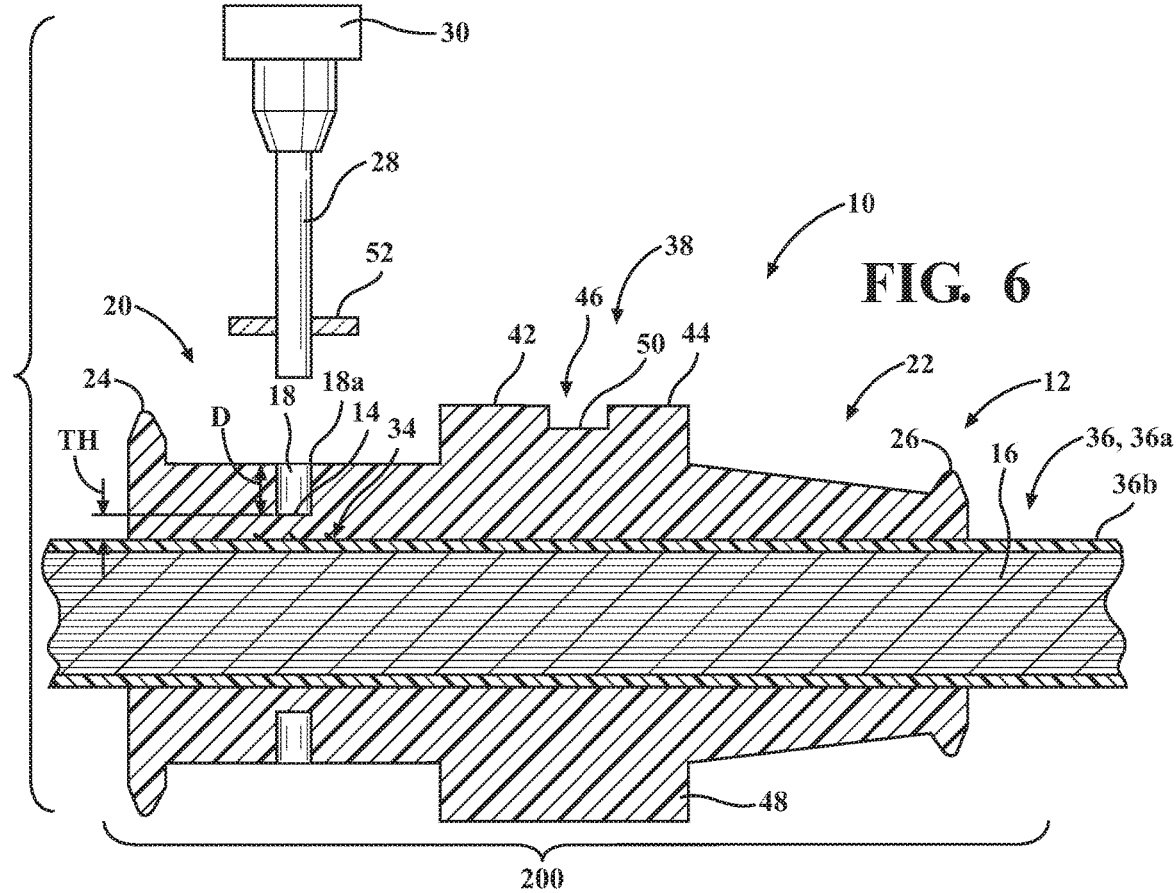
FIG. 6 is a view of FIG. 4 showing the adhesion point formed by melted material in the hole.

The inner wall 14 is configured to melt upon a thermal load applied by the soldering tip 28, wherein upon cooling of the grommet 10, the grommet 10 is adhered to the wiring harness 36 at the location where the inner wall 14 of the grommet 10 melts to form an adhesion point 34, as indicated in FIG. 6. For example, the grommet 10 may be formed of a material having a melting point between 150-200° C.

FIG. 4, shows that the hole 18 extends into the first body member 20 a depth "D". It should be appreciated that the depth of the hole 18 may be varied based upon the length of the soldering tip 28, and the diameter of the hole 18 may be varied based upon the girth of the soldering tip 28.

With reference again to FIGS. 1-3, the tubular body 12 may further include a groove feature 38. For illustrative purposes the catch 38 is shown integrally formed to the tubular body 12, however it should be appreciated that the catch 38 may be made as a separate piece. The catch 38 is configured to engage a substrate (not illustrated) so as to secure the grommet 10 to the substrate and allow the wiring harness 36 to be routed through the substrate. For illustrative purposes, the substrate may be a panel of an automotive vehicle or a bracket to be installed in an automotive vehicle.

In one embodiment, the catch 38 is disposed between the first body member 20 and the second body member 22. An illustrative example of a catch 38 is shown in FIGS. 1-3. The catch 38 is configured to clamp onto a substrate. In one embodiment, the catch 38 includes a first collar 42 spaced apart from a second collar 44 to define a circumferential groove 46. The circumferential groove 46 has a width designed to provide a clamping force onto the opening 18a of the substrate.

A base portion 48 interconnects the first collar 42 to the second collar 44. The base portion 48 provides additional material to the catch 38 to help the catch 38 absorb vibrational forces which may occur in the operating environment. The circumferential groove 46 has a width configured to fittingly receive the thickness of a substrate.

The first collar 42 is adjacent to the first body member 20. The second collar 44 is adjacent the second body member 22. The outer surface of the second collar 44 is formed by a constant radius. The circumferential groove 46 is not uniform to define a neck portion 50 which has a varied depth with respect to the outer surface of the second collar 44. Such a configuration may be desirable to provide a fitting engagement within an opening (not illustrated) of a substrate. For instance, the opening may be irregular in dimension to have a wide portion and a narrow portion, wherein the grommet 10 may be turned within the opening to force fit the wider portion of neck portion 50 into a narrow portion of the opening. It should be appreciated that the catch 38 may be dimensioned otherwise without deviating from the scope of the appended claims.

In one embodiment, as shown in FIGS. 1-3, the tubular body 12 includes a plurality of holes 18. The holes 18 may be uniform in dimension. The holes 18 are configured to provide a respective number of adhesion points 34. That is, each hole 18 is configured to receive a soldering tip 28 of a soldering device 30 and thus provides an adhesion point 34, wherein the grommet 10 is melted and adhered to the wiring harness 36a. It should be further appreciated that that the axial length of the tubular body 12 may be increased or decreased relative to what is shown in the figures to accommodate a desired number of holes 18, and thus the dimension of the grommet shown herein is not limiting to the scope of the appended claims.

In such an embodiment, it is possible to configure a grommet assembly 200 with a desired retention strength with respect to the wiring harness 36a as described above. Though the figures show the holes 18 disposed only in the first body member 20, it should be appreciated that the holes 18 may be formed in the second body member 22 as well.

In the embodiment shown in the figures, the placement of the adhesion points 34 in the first body member 20 provides greater rigidity to the wiring harness 36a disposed therein relative to the portion of the wiring harness 36a disposed in the second body member 22. Accordingly, it should be appreciated that the rigidity and flexibility of the wiring harness 36a may be tuned by the placement and number of the adhesion points 34.

An operation of the grommet 10 is illustratively provided with reference now to FIGS. 1, and 4-6. FIG. 4 shows the soldering tip 28 of a soldering device 30 disposed above the hole 18. The soldering tip 28 is registered to engage the hole 18. The hole 18 is closed by the inner wall 14 forming the barrier 32 between the soldering tip 28 and the wiring harness 36a.

Figure 5:
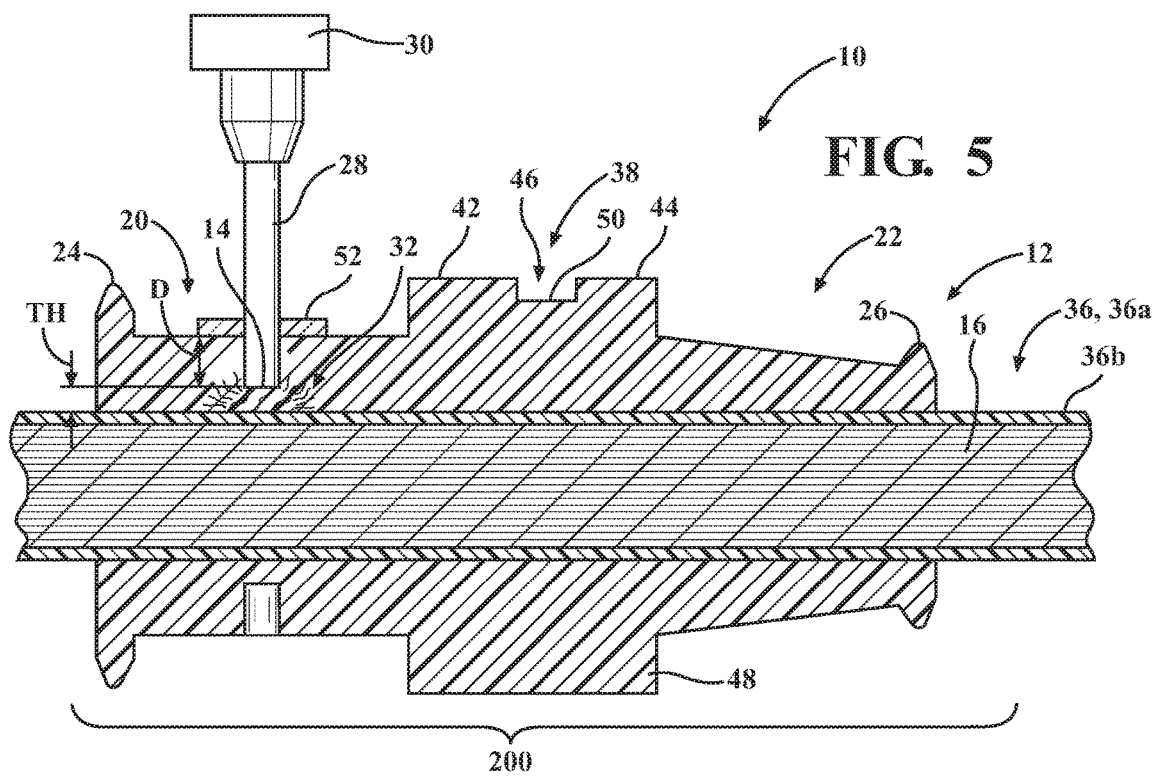
FIG. 5 is a view of FIG. 4 showing the soldering tip engaged in the hole.

FIG. 5 shows the soldering tip 28 disposed within the hole 18. The distal end of the soldering tip 28 is in contact with the barrier 32. The soldering device 30 may be actuated to heat the soldering tip 28 and melt the barrier 32. The melted barrier 32 is illustrated in FIG. 5 by the hatched markings. For illustrative purposes, the soldering tip 28 may be configured to reach a temperature of 350° C. and the barrier 32 is configured to melt at a temperature of 200° C. The soldering tip 28 may be introduced into the hole 18 manually or through machine automation. In instances where the grommet 10 includes a plurality of holes 18, a single operator may actuate the soldering device 30 and insert the soldering tip 28 into each hole 18 while a tool is used to hold grommet 10 in position so the grommet 10 remains stationary while receiving multiple thermal loads from the soldering tip 28.

In one embodiment, the soldering device 30 may further include a stopper 52. In one embodiment of the stopper, the stopper 52 is a disk. The disk 52 may be formed out of a thermally resistant material. The disk 52 is positioned a predetermined distance from the distal end of the soldering tip 28 at a length that is less than the length of the hole 18. Thus, the soldering tip 28 is placed in contact with the inner wall 14.

FIG. 6 shows how the melted inner wall 14 is cooled. Cooling may be achieved through ambient air temperature or a cooling device such as a fan. When cooled, the melted inner wall 14 adheres to the protective sleeve 36b of the wiring harness 36.

Though the wiring harness 36 is shown as a single wire, it should be appreciated that the wiring harness 36 may be configured otherwise. For example, the wiring harness 36 may be a wiring harness 36a having a plurality of wires, each of which are sheathed by the protective sleeve 36b. In one embodiment, the protective sleeve 36b is formed from polyurethane.

Accordingly, the wiring harness 36a may be fixed to the grommet 10. As discussed above, the grommet 10 may include a plurality of holes 18 to provide a corresponding number of adhesion points 34. FIGS. 1-3 show an illustrative embodiment wherein there are twelve (12) holes 18. The holes 18 all have the same radius and each row of holes is 45 degrees relative to each other. In the embodiment shown in FIGS. 1-3, the rigidity of the wiring harness 36a is greater within the first body member 20 of the grommet 10 relative to the second body member 22 of the grommet 10.

Figure 7:
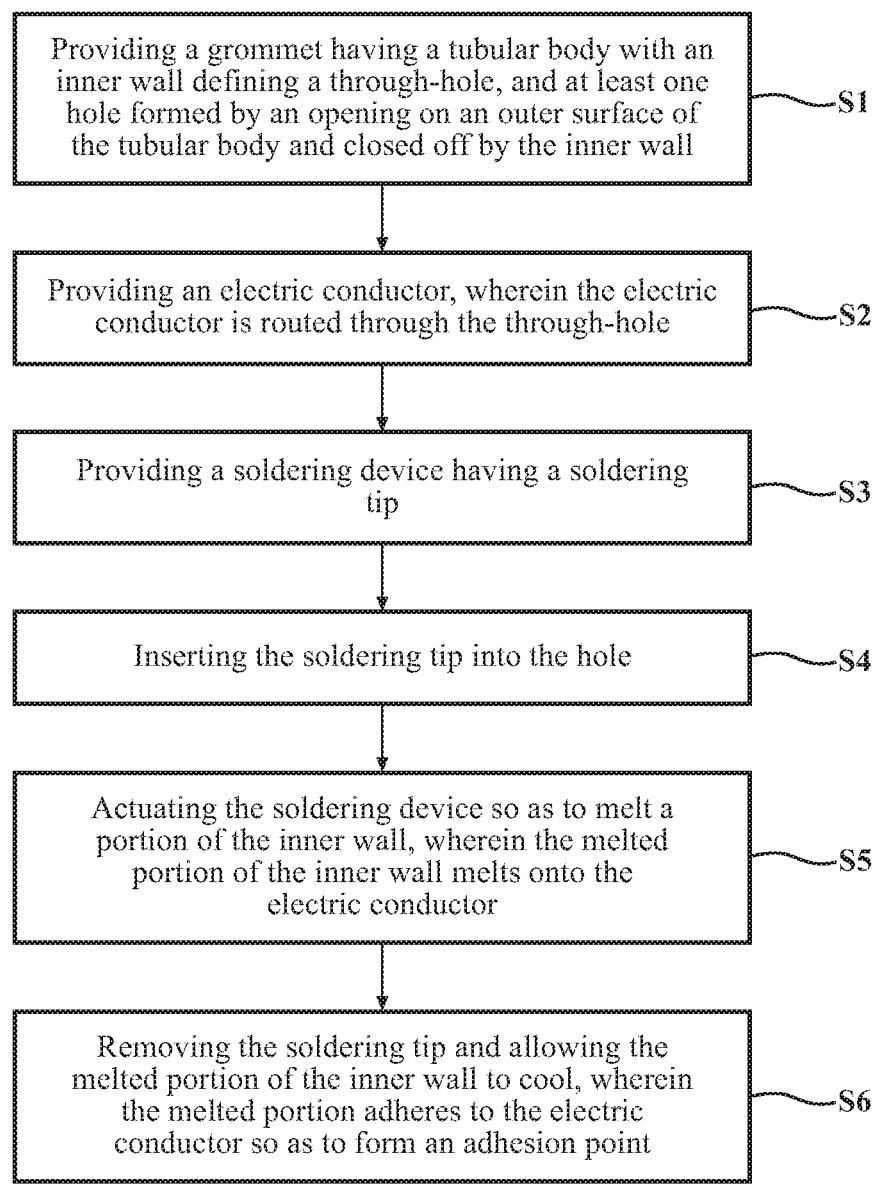
FIG. 7 is a diagram showing the steps of a method for manufacturing a grommet assembly.

With reference now to FIG. 7, a method 100 of manufacturing a grommet assembly 200 is also provided. The grommet assembly 200 includes a grommet 10 and a wiring harness 36. The method 100 includes step S1 of providing the grommet 10. The grommet 10 includes a tubular body 12 having an inner wall 14 defining a through-hole 16. The through-hole 16 extends axially through the tubular body 12. The grommet 10 further includes at least one hole 18. The hole 18 is formed by an opening 18a on an outer surface of the tubular body 12 and is closed off by the inner wall 14.

The method 100 includes step S2 of providing a wiring harness 36. The wiring harness 36 may be sheathed by a protective sleeve 36b. The wiring harness 36 is routed through the through-hole 16, wherein the ends of the wiring harness 36 extend beyond the ends of the tubular body 12. The protective sleeve 36b must be formed out of the same material as the tubular body 12.

The method 100 proceeds to step S3 of providing a soldering device 30 having a soldering tip 28, and step S4 of inserting the soldering tip 28 into the hole 18. The method 100 proceeds to step S5 wherein the soldering device 30 may be actuated to melt a portion of the inner wall 14, wherein the melted portion of the inner wall 14 melts onto the wiring harness 36.

The method 100 proceeds step S6 of removing the soldering tip 28 and allowing the melted portion of the inner wall 14 to cool, wherein the melted portion adheres to the wiring harness 36 to form an adhesion point 34. The adhesion point 34 secures the grommet 10 to the wiring harness 36.

It should be appreciated that method 100 may include the step of providing a grommet 10 with a plurality of holes 18 by drilling. In one embodiment, the plurality of holes 18 may be uniform in dimension. The holes 18 are configured to provide a corresponding number of adhesion points 34. That is, each hole 18 is configured to receive a soldering tip 28 of a soldering device 30 and thus provides an adhesion point 34.

In one embodiment, the grommet 10 includes a catch groove 38. For illustrative purposes the catch 38 is shown integrally formed into the tubular body 12; however it should be appreciated that the catch 38 may be made as a separate piece. The catch 38 is configured to secure the grommet 10 to the substrate while allowing the wiring harness 36 to be routed through the substrate. In one embodiment, the catch 38 is disposed between the first body member 20 and the second body.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A grommet configured to adhere to a wiring harness by a soldering device having a soldering tip and route the wiring harness through a substrate, the grommet comprising:
   a tubular body having an inner wall defining a through-hole;
   a hole, the hole is dimensioned to receive the soldering tip, wherein the hole extends radially with respect to the through-hole, the hole is open at an outer surface of the tubular body, the outer surface being concentric to the through-hole and extends inwardly from the outer surface of the tubular body to the inner wall so as to be closed by the inner wall.

2. The grommet as set forth in claim 1, wherein the tubular body includes a first body member opposite a second body member.

3. The grommet as set forth in claim 1, further including a catch configured to engage the substrate.

4. The grommet as set forth in claim 3, wherein the catch is integrally formed to the tubular body.

5. The grommet as set forth in claim 4, wherein the catch is a pair of collars spaced apart from each other so as to define a circumferential groove.

6. The grommet as set forth in claim 1, further including a plurality of holes, wherein each one of the plurality of holes is uniform in dimension.

7. The grommet as set forth in claim 1, wherein the tubular body includes a first body member opposite a second body member, the hole is disposed in the first body member.

8. The grommet as set forth in claim 7, wherein the hole is a plurality of holes.

9. The grommet as set forth in claim 1, wherein the inner wall is formed of the same material as a protective sleeve in which the wiring harness is sheathed.

* * * * *